UNITED STATES PATENT OFFICE.

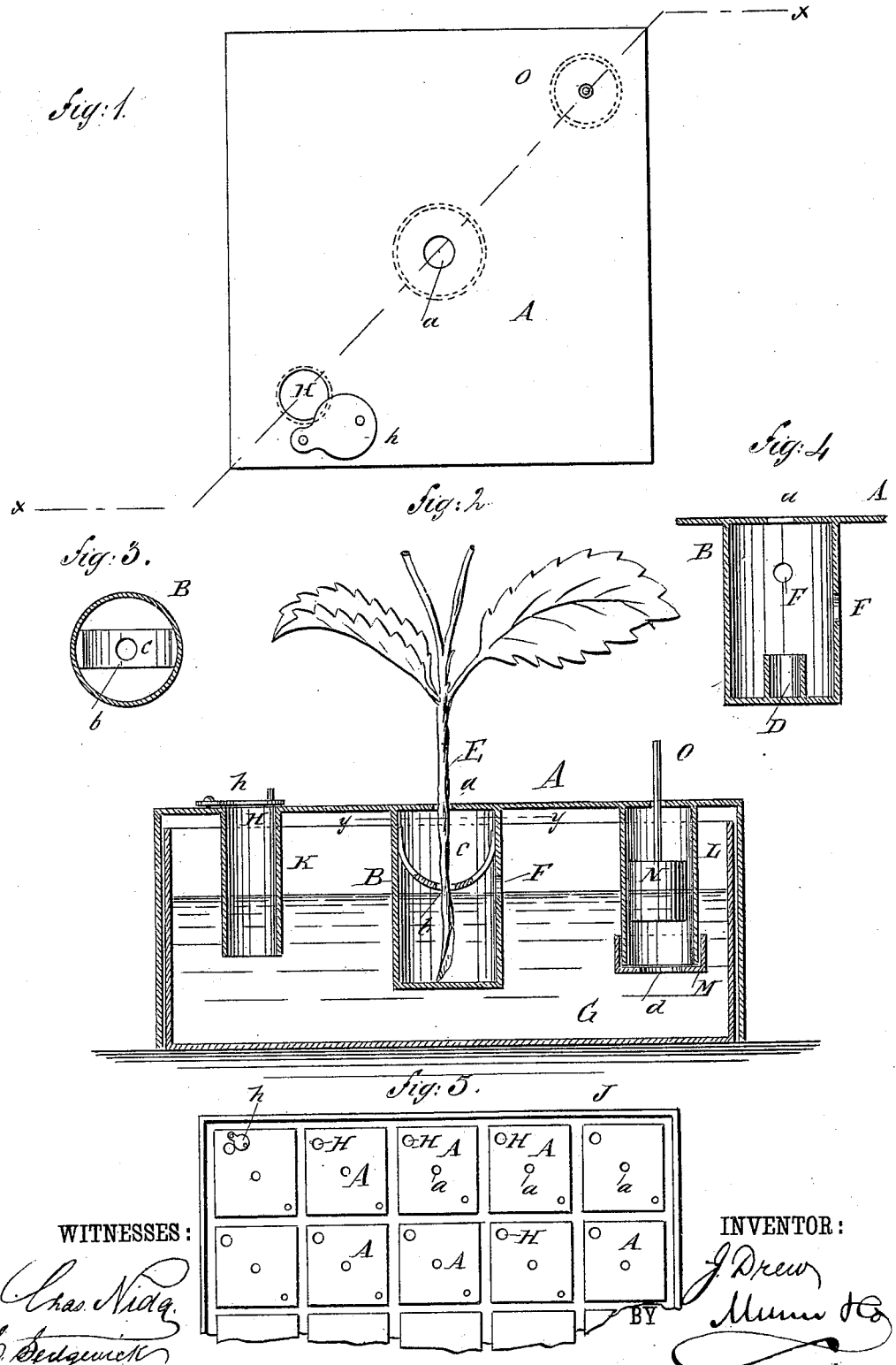

JOHN DREW, OF OLD MISSION, MICHIGAN.

FLOWER-TRAY.

SPECIFICATION forming part of Letters Patent No. 258,389, dated May 23, 1882.

Application filed March 21, 1882. (Model.)

*To all whom it may concern:*

Be it known that I, JOHN DREW, of Old Mission, in the county of Grand Traverse and State of Michigan, have invented a new and Improved Flower-Tray, of which the following is a full, clear, and exact description.

The object of my invention is to provide a new and improved tray for keeping cut flowers fresh during transportation or exposition.

The invention consists in a box open at the bottom and provided with an aperture in its top, and with a closed cup attached to the under side of its top, into which cup the stem of the flower is passed through the aperture in the top.

The invention further consists in devices for holding the stem of the flower in the cup attached to the under side of the top of the box; and the invention also consists in the combination, with the above-mentioned box, of a water-reservoir passed into the bottom of the box for the purpose of supplying the cup with water to keep the flowers alive and fresh, all as will be fully described hereinafter.

Reference is to be had to the accompanying drawings, forming a part of this specification, in which similar letters of reference indicate corresponding parts in all the figures.

Figure 1 is a plan view of my improved flower-tray. Fig. 2 is a diagonal cross-sectional elevation of the same on the line $x\ x$, Fig. 1. Fig. 3 is a sectional plan view of the cup held to the under side of the top of the box on the line $y\ y$, Fig. 2. Fig. 4 is a longitudinal sectional elevation of the same. Fig. 5 is a plan view of a series of boxes arranged in a tray or pan.

A square, oblong, or polygonal box, A, open at the bottom, is provided in the middle of its top with an aperture, $a$, of sufficient size to admit the stem of a flower. Below this aperture a cylindrical or other cup or vessel, B, is attached to the under side of the top of the box A, the mouth of the cup being attached to the under side of the top of the box, as shown in Figs. 2 and 4. A short distance from its top this cup B is provided with a straight or curved transverse strip, C, provided with an aperture, $b$, directly below the aperture $a$; or, in place of the strip C, the bottom of the cup B is provided with an open tubular projection, D.

The stem E of the flower is passed through the apertures $a\ b$, or through the aperture $a$, and the lower end of the stem is passed into the tubular projection D, whereby the stem will be held in position and will be prevented from falling over. The cup B is provided near its top with a side aperture, F.

A water-reservoir, G, open on top, is made of such size and shape that it can be passed into the open bottom of the box or tray A, as shown in Fig. 1.

The top of the box A is provided in one corner with an aperture, H, which can be closed by a swinging or sliding gate, $h$, from which aperture H a tube, K, projects downward into the water in the reservoir G.

A tube, L, projects downward from the under side of the top of the box A into the water in the reservoir, and this tube is provided at its lower end with a cap, M, provided with an aperture, $d$. A float, N, is contained in this tube L, and to this float a rod, O, is attached, which projects through an aperture in the top of the box A.

A series of the boxes A are placed in a tray or pan, J, as shown in Fig. 5, or the boxes can be used singly.

The operation is as follows: The reservoirs G are filled with water to such a height that the water can pass into the aperture F of the cups B when the boxes A are placed over the reservoirs. When the cups B have been partially filled with water the boxes are raised and held in this position by the buoyancy of the cups B, which project partially into water in the reservoir G. The water in the cups B is absorbed by the stems of the flowers and keeps the flowers alive and fresh. When all the water in the cups B has been absorbed by the flowers the boxes A are pressed downward again until the apertures F are below the level of the water in the reservoirs G and water can flow into the cups B. Then the boxes are raised again and held in this position, as described above. If so much water has been absorbed by the flowers and stems that the level of the water in the reservoirs does not reach to the apertures F when the boxes A are lowered as much as possible, the gates $h$ are opened and a funnel is placed into the aperture H, and water is poured through the funnel into the reservoir until the level of the water has reached the desired height again. As the boxes A completely cover the reservoirs little or no water can evaporate, the water can not be seen, and the boxes A also prevent the water in the reservoir from being spilled easily. In case any of the water is spilled it passes into the box or pan J, into which the boxes A are placed. The rod O, attached to the float N and projecting from the top of the box A, indicates the height of water in the reservoir G.

Cut flowers can thus be transported great distances without withering, and likewise can be exhibited—for instance, at a fair, or in a show-case, of a store, &c.—without withering for a long time. The stems are all held straight, and a number of combined boxes A, each containing a flower, have a handsome appearance.

If desired, the box A may be used without the reservoir, and the water can be poured into the cup B through the aperture $a$; but I prefer to use the box A in combination with the reservoir, as described.

Having thus described my invention, I claim as new and desire to secure by Letters Patent—

1. In a flower-tray, the combination, with the box provided with an aperture in its top, of a closed vessel secured to the under side of the top of the said box, and provided with means, substantially herein shown and described, for holding the lower ends of the flowers, as set forth.

2. In a flower-tray, the combination, with the box A, provided with an aperture, $a$, in its top, and having a closed vessel or cup, B, with a side aperture, F, attached to the under side of its top, of the reservoir G, substantially as herein shown and described, and for the purpose set forth.

3. In a flower-tray, the combination, with the box A, having an aperture, $a$, in its top, and with the reservoir G, of the closed vessel or cup B, attached to the under side of the top of the box A, and provided with a side aperture, F, and with an apertured transverse strip, C, substantially as herein shown and described, and for the purpose set forth.

4. In a flower-tray, the combination, with the box A, having apertures $a$ and H in its top, and having a vessel or cup, B, attached to the under side of its top, of the reservoir G, substantially as herein shown and described, and for the purpose set forth.

5. In a flower-tray, the combination, with the box A, having a cup, B, attached to the under side of its top, of the reservoir G, the tube L, the float N, and the indicator-rod, O, substantially as herein shown and described, and for the purpose set forth.

6. In a flower-tray, the combination, with the box A, having apertures $a$ and H in its top, and having a vessel or cup, B, attached to the under side of its top, of the reservoir G, and gate $h$, for closing the aperture H, substantially as herein shown and described, and for the purpose set forth.

JOHN DREW.

Witnesses:
 W. A. MARSHALL,
 GEORGE LARDIE, Jr.